United States Patent [19]

Ballou

[11] 3,745,362
[45] July 10, 1973

[54] TWO RELAY CONTROL CIRCUIT FOR AUTOMOTIVE VEHICLES
[75] Inventor: Richard P. Ballou, Howell, Mich.
[73] Assignee: General Motors Corporation, Detroit, Mich.
[22] Filed: May 22, 1972
[21] Appl. No.: 255,790

[52] U.S. Cl. .............................. 307/10 R, 200/61.54
[51] Int. Cl. ............................................... H02j 1/00
[58] Field of Search................. 307/10 R, 9; 200/44, 200/61.54; 340/64; 317/134

[56] References Cited
UNITED STATES PATENTS
3,614,459   10/1971   Watson ............................. 307/10 R
3,525,875   8/1970   Ziomek ............................. 307/10 R
3,514,623   5/1970   Ballard ............................. 307/10 R Primary Examiner—Robert K. Schaefer
Assistant Examiner—William J. Smith
Attorney—Warren D. Hill

[57] ABSTRACT

A circuit for enabling the accessories, starter solenoid, ignition circuit and gauges of an automotive vehicle includes an ignition switch with its movable contact connected to ground through a key and two output conductors, each in series with a relay, which are selectively energized, singly or together, according to the switch position. A switching network containing several switches, each operated by one of the relays, is arranged so that the low power accessories are energized when the switch is in the off position and one relay is energized, the starter solenoid ignition circuit and the gauges are energized when the switch is in the start position and both relays are energized, and all the utilization circuits are enabled when the switch is in the on position and the second relay is energized. An auxiliary circuit provides for horn operation and audible warnings when the vehicle lights are on or the key is inserted in the ignition switch when a vehicle door is open.

3 Claims, 1 Drawing Figure

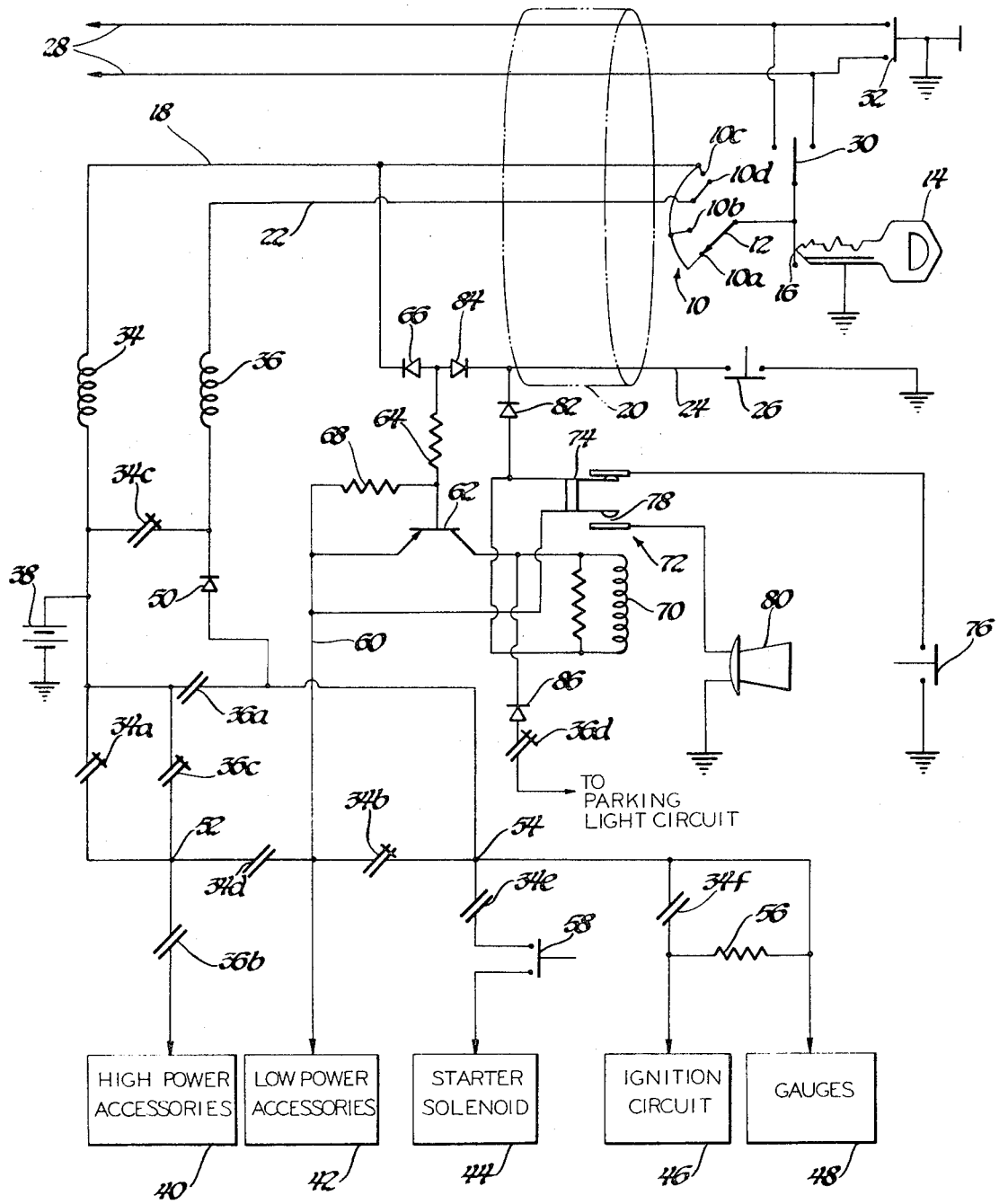

TWO RELAY CONTROL CIRCUIT FOR AUTOMOTIVE VEHICLES

This invention relates to a control circuit for automotive vehicle electrical equipment.

A large number of vehicle electrical devices are controlled according to the position of the ignition switch, e.g., high power accessories, low power accessories, starter solenoid, ignition circuit and gauges. Traditionally, to effect the required controls, a large number of conductors are routed through the vehicle steering column to an elaborate ignition switch. According to the present invention, only two wires extending through the steering column to a very simple ignition switch are required. To accomplish other functions normally controlled at the steering column, it is necessary to add only two wires for signal circuits and one wire for a horn.

It is therefore an object of this invention to provide an electrical circuit control for an automotive vehicle which minimizes the number of wires extending to the ignition switch.

It is another object of the invention to provide an electrical circuit control for an automotive vehicle having two conductors selectively energized by the ignition switch, each controlling a relay for selectively enabling vehicle utilization devices in response to the energization of either or both of the relays.

The invention is carried out by providing two relays, each connected to a switch by a single conductor for selective energization thereof and a switching network including several contacts of the relays for selectively supplying power to high power accessories, low power accessories, the starter solenoid, the ignition circuit or gauges according to whether one or the other of the relays, or both, is energized.

The above and other advantages will be made more apparent from the following specification taken in conjunction with the FIGURE which is a schematic electrical diagram of an automotive vehicle electrical circuit control according to the invention.

A key-operated ignition switch 10 includes a movable contact 12 which is moved according to the rotation of a key 14. The contact 12 is connected through a contact element 16 and the key 14 to ground so that the switch 10 is connected to ground only when the key 14 is inserted in the ignition switch to make a circuit with the contact 16. The stationary contacts of the switch 10 include a contact 10a in ignition lock position, contact 10b in off position and contact 10c in start position, which contacts are all electrically connected to a first conductor 18 extending through the steering column 20 represented by broken lines. A further stationary contact 10d bridges the on and start positions of the ignition switch and is connected to a second conductor 22 extending through the steering column.

Other wires in the steering column include the horn control line 24 which is connected to ground through a horn button 26 and a pair of wires 28 for controlling signal circuits and connected to turn signal switch 30 and a hazard warning switch 32. The details of the signal circuits are set forth in the U.S. Pat. application of Richard P. Ballou, Ser. No. 162,234, filed July 13, 1971.

The first conductor 18 is connected to the coil of a relay 34, while the second conductor 22 is connected to the coil of a relay 36. The relays control a switching circuit which selectively connects the vehicle battery or power supply 38 to utilization devices on the vehicle which include high power accessories 40, low power accessories 42, the starter solenoid 44, an ignition circuit 46, and gauges 48. Contacts in the switching circuit controlled by relays 34 include normally closed contacts 34a, 34b and 34c as well as normally open contacts 34d, 34e and 34f. Similarly, the relay 36 includes normally open contacts 36a and 36b and normally closed contacts 36c. The coil of the relay 34 is connected directly to the battery 38 so that when the line 18 is grounded through the switch 10, the relay 34 is energized. The coil of relay 36 is connected to the battery through normally closed contacts 34c so that when the line 22 is grounded through the switch 10, the relay 36 is energized, provided the contacts 34c have not been opened due to a prior energization of relay 34. When, however, the relay 36 does become energized, the contacts 36a are closed to supply an alternate conducting path to relay 36 through a diode 50 so that the relay 36 is latched in an energized state so long as line 22 is grounded; the subsequent energization of relay 34 does not interrupt the current thereto. This arrangement requiring the relays 36 to be energized prior to the relay 34, provides a safety feature since, as will be described below, both relays must be energized to enable the starter solenoid 44. Thus the chances of accidentally starting the vehicle due to shorting of the lines 18 and 22 is minimized since the wires would both have to be shorted in proper sequence to energize the starter.

The contacts 34a and 36c are connected in parallel between the battery 38 and a junction point 52. That junction point is connected through contacts 36b to the high power accessories 40. Contacts 34d when closed, connect the junction point 52 to the low power accessories 42. The contacts 36a are connected between the battery 38 and a junction point 54. Junction point 54 is connected through contacts 34b to the low power accessories 42. The junction 54 is also connected directly to the gauges 48 and is connected to the ignition circuit 46 through an ignition coil dropping resistor 56. Contacts 34f are arranged in parallel with the resistor 56 to provide a resistor bypass during starting. The starter solenoid 44 is connected to junction point 54 through contacts 34e and a neutral safety switch 58 which is preferably mechanically connected to the transmission range selector or gear shift of the vehicle so the switch 58 is closed only when the transmission is in a neutral condition.

In operation of the circuit thus far described, when the key 14 is inserted into the ignition switch and the switch is in either the key lock or off position, the relay 34 will be energized to open contacts 34c and close contacts 34d so that power will be supplied to the low power accessories 42 through contacts 36c and 34d and no other portion of the circuit will be energized. When the switch 10 is moved through the on position to start position, the relay 36 will first be energized and then relay 34 will be energized to switch all the contacts to a condition opposite that shown in the drawing. Thus contacts 34a, 34b and 36c will be open to prevent any power or any current flow to the accessories. Contacts 36a, 34e and 34f will be closed to supply power to the gauges, to the ignition circuit through the bypass contact 34f and to the starter solenoid, provided that the neutral safety switch 58 is closed. Then, when the engine is started and the ignition switch is returned to on position, the relay 34 will be deenergized to open the bypass contacts 34f and close the contacts 34a and 34b so that current will be supplied to both sets of accessories.

Optionally, certain accessories may be connected at junction points 52 and 54 if operation thereof is desired when these points are energized.

The circuit for operating the horn and the audible signal for indicating lights on or that the key is in place in the ignition switch when the driver's door is open, has power supplied from the low power accessory circuit via line 60 to the emitter of the transistor 62 which has its base connected through a resistor 64 and a diode 66 to the line 18 so that the transistor will be in an on state when the switch 10 is in lock or off position. A bias resistor 68 is connected between the emitter and base of the transistor. The collector is connected through the coil 70 of the horn buzzer relay 72 to normally closed contacts 74 of the relay, which in turn are grounded when a key door switch 76 is closed, as when the driver's vehicle door is open. The normally open contacts 78 of the horn relay are connected between the input line 60 and the horn 80. The low voltage side of the relay coil 70 is connected through a diode 82 to the horn button 26. In addition, the base resistor 64 is connected through a diode 84 to the horn button 26. The vehicle parking light circuit is connected to the high voltage side of the relay 70 through normally closed contacts 36d operated by the relay 36 and a diode 86.

In operation of the warning circuit, closing the horn button 26 grounds the base of the transistor 62 through the diode 84 to render the transistor conductive if the line 60 is energized as when the key is in the lock, off or on position, and grounds the relay coil 70 through diode 82 so that the relay is energized to close the contacts 78 and energize the horn 80. Thus, the horn may not be energized when the key 14 is removed from the switch. When the door switch 76 is closed and the vehicle lights are on, the relay coil 70 is energized through the contacts 36d, diode 86 contacts 74 and switch 76 to cause the contacts 74 to intermittently open and close to produce a buzzing sound thereby warning the vehicle operator that the lights are on when the door is open. Of course, the buzzer will not operate when the contacts 36d are open as when the ignition switch is in the on position. Similarly, the contacts 74 are caused to buzz when the key 14 is in the switch, thereby rendering transistor 62 conductive and the door switch 76 is closed to complete a circuit through the transistor, the coil 70, the contacts 74 and the door switch 76. This, of course, provides a warning that the key 14 has been left in the switch when the door is open.

It will thus be seen that this invention minimizes the wiring required in the steering column by using only two wires for energizing two relays for selectively enabling the high power accessories, the low power accessories, the starter solenoid, the ignition circuit and the gauges.

The embodiment of the invention described herein is for purposes of illustration and the scope of the invention is intended to be limited only by the following claims.

It is claimed:

1. A circuit for an automotive vehicle for operating an ignition circuit, a starter solenoid and accessories, including a power supply and comprising first and second conductors, first and second relays connected to the first and second conductors respectively, a switch means connected for selectively completing circuits with the conductors and the power supply for energizing the relays singly and in combination, and a switching circuit from the power supply to the ignition circuit, the starter solenoid and the accessories comprising contact means actuated by the first relay for supplying power to the accessories when the first relay alone is energized, and other contact means actuated by the first relay and contact means actuated by the second relay for supplying power to the starter solenoid and the ignition circuit when both relays are energized, the contact means actuated by the second relay supplying power to the ignition circuit and the accessories when the second relay only is energized.

2. A circuit for an automotive vehicle for operating an ignition circuit, a starter solenoid and two groups of accessories, including a power supply and comprising first and second conductors, first and second relays connected with one side of the power supply and connected to the first and second conductors respectively, a switch connected for selectively completing circuits with the conductors and the other side of the power supply for energizing the relays singly and in combination, and a switching circuit from the power supply to the ignition circuit, the starter solenoid and the accessories comprising contacts actuated by the first relay for supplying power to one group of accessories when the first relay alone is energized, other contacts actuated by the first relay and contacts actuated by the second relay for supplying power to the starter solenoid and the ignition circuit when both relays are energized, and means including the contacts actuated by the second relay and normally closed contacts of the first relay for supplying power to the ignition circuit and both groups of accessories when the second relay only is energized.

3. A circuit for an automotive vehicle for operating an ignition circuit, a starter solenoid, and first and second groups of accessories, including a power supply and comprising first and seocnd conductors, first and second relays connected with one side of the power supply and connected to the first and second conductors respectively, a key operated ignition switch connected for selectively completing circuits with the conductors and the other side of the power supply for energizing the first relay when in a first switch position, the second relay when in a second switch position, and both relays when in a third switch position, the key forming a part of the switch and being in series with the power supply so that the circuits can be energized only when the key is inserted in the key operated switch, and a switching circuit from the power supply to the ignition circuit, the starter solenoid and the accessories comprising normally open contacts closed by the first relay for supplying power to one group of accessories through normally closed contacts of the second relay when the first relay alone is energized, normally open contacts closed by the second relay and normally open contacts in series with the starter solenoid and the ignition circuit and closed by the first relay for supplying power to the starter solenoid and the ignition circuit when both relays are energized, and means operative when the second relay only is energized including the contacts closed by the second relay for supplying power to the ignition circuit, and normally closed contacts of the first relay and further normally open contacts closed by the second relay for supplying power to both groups of accessories.

* * * * *